United States Patent [19]

Toyama et al.

[11] Patent Number: 5,727,085
[45] Date of Patent: Mar. 10, 1998

[54] WAVEFORM DATA COMPRESSION APPARATUS

[75] Inventors: Akira Toyama; Kazuhiko Hakuta, both of Tokyo; Masayoshi Nakamura; Masataka Saito, both of Osaka, all of Japan

[73] Assignees: Nippon Precision Circuits Inc., Tokyo; Matsushita Electric Industrial Co., Ltd., Osaka, both of Japan

[21] Appl. No.: 528,457

[22] Filed: Sep. 14, 1995

[30] Foreign Application Priority Data

Sep. 22, 1994 [JP] Japan ................................ 6-227930

[51] Int. Cl.$^6$ .................................................. G06K 9/36
[52] U.S. Cl. ............................................................ 382/232
[58] Field of Search ............................. 382/232, 238, 382/239, 240, 235, 243; 395/2.91, 2.92, 2.94, 2.95

[56] References Cited

U.S. PATENT DOCUMENTS

| | | |
|---|---|---|
| 5,054,103 | 10/1991 | Yasuda et al. ................. 382/238 |
| 5,117,287 | 5/1992 | Koike et al. ................... 382/238 |
| 5,500,907 | 3/1996 | Kunitake et al. ............... 382/240 |
| 5,557,800 | 9/1996 | Kasimov et al. ............... 382/232 |
| 5,598,484 | 1/1997 | Suzuki et al. .................. 382/239 |

*Primary Examiner*—Jose L. Couso
*Attorney, Agent, or Firm*—Jordan and Hamburg

[57] ABSTRACT

In an APC system waveform dam compression apparatus which generates an optimum prediction coefficient utilizing a block calculation process in a first mode and generating prediction data utilizing a block calculation process based on this optimum prediction coefficient in a second mode with respect to a fixed number of blocked waveform data, to make possible use of suitable data in the first prediction calculation process of each block calculation process. A data holding section for holding data corresponding to at least final first waveform data to be used in a final prediction calculation process of a block calculation process in a second mode, and a first selection section for using data held in the data holding section in place of data memorized in a second delay section in each first prediction calculation process of each block calculation process of the next block are provided in an operating circuit.

7 Claims, 4 Drawing Sheets

WAVEFORM DATA COMPRESSION APPARATUS

BACKGROUND OF THE INVENTION

The present application relates to a waveform data compression apparatus used in digital audio apparatuses etc.

The APC (adaptive predictive coding) system is known as one method for compressing waveform data such as audio signals etc. In this APC system, waveform data of constant intervals, i.e. constant numbers, are taken as one block, an optimum prediction coefficient is obtained per each unit of one block, and prediction data is generated based on these optimum prediction coefficients. Then the differences (errors) between the prediction data and input dam, and other data, are output in block units. In the APC system, because prediction calculation processing is performed in block units, it is possible to increase the prediction gain, improving the quality of the coding.

Figure 3:
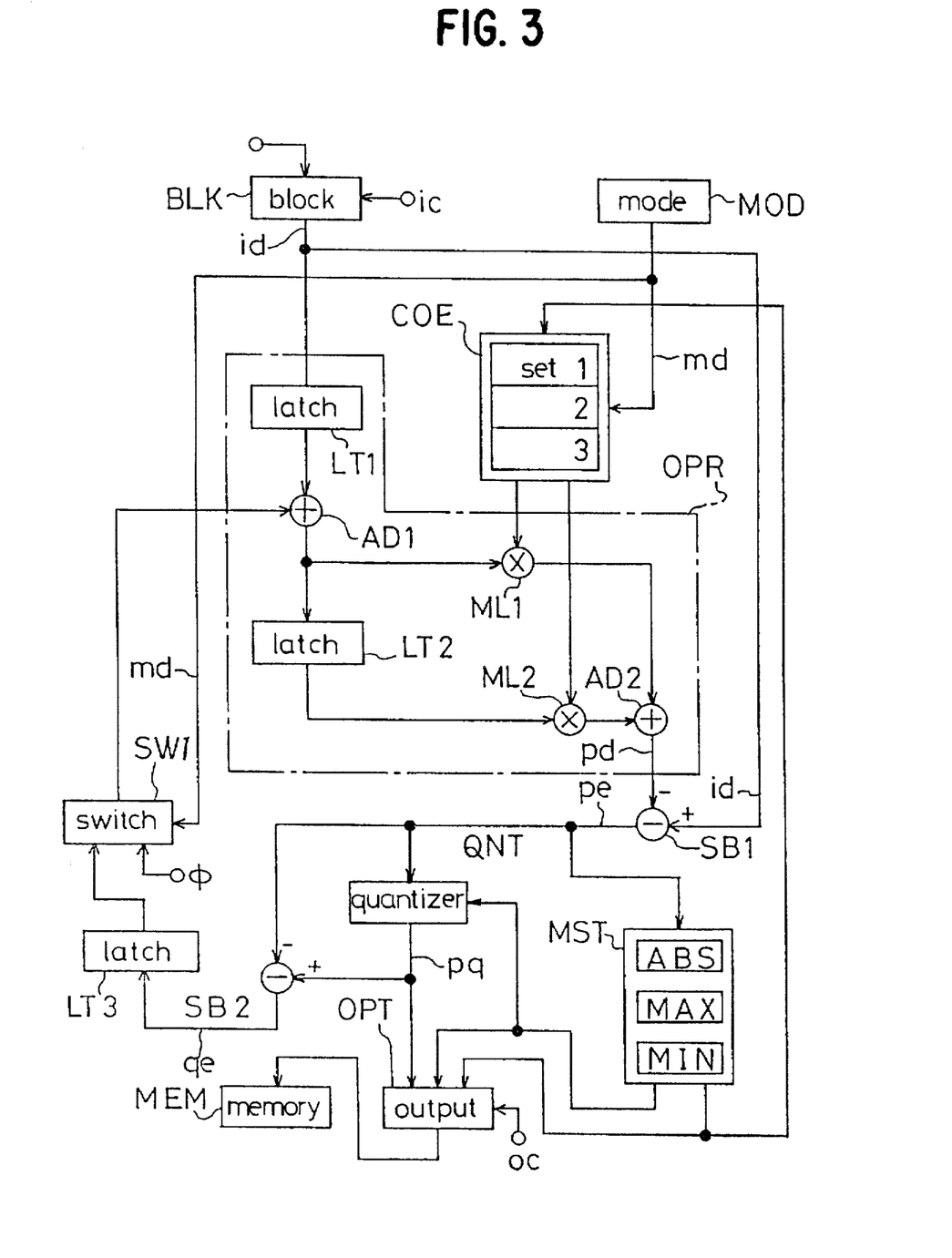
FIG. 3 is a block drawing showing the structure of a prior art example.

FIG. 3 is a block drawing showing a prior art example of a waveform data compression apparatus using the APC system. Firstly, the structure of the waveform data compression apparatus shown in FIG. 3 will be explained.

A blocking circuit BLK blocks a fixed number of a plurality of digitalized continuous input waveform data of an audio signal as one block (here eight waveform data form one block). An operating circuit OPR sequentially inputs eight input waveform data "id1–8" blocked by the blocking circuit BLK and performs prediction calculation processing in one block units with respect to these input waveform data "id1–8" (each having a 16-bit structure) (here, prediction calculation processing of one block unit will be referred to as block calculation processing) to sequentially generate prediction waveform data "pd1–8" (each having a 16-bit structure). This operating circuit OPR is formed by latches LT1 and LT2 functioning as delay ckcuits, multipliers ML1 and ML2, and adders AD1 and AD2.

A prediction coefficient memory circuit COE memorizes a plurality of set portions of prediction coefficient sets comprising a prediction coefficient used in the multiplier ML1 and a prediction coefficient used in the multiplier ML2. Here it memorizes three set portions of prediction coefficient set 1, prediction coefficient set 2 and prediction coefficient set 3.

A mode specifying circuit MOD specifies a first mode and a second mode by a mode specifying signal "md". Where the first mode is specified, the above block calculation process is performed on the prediction coefficient sets 1, 2 and 3 and, based on the calculation result thereof, an optimum prediction coefficient set from among the prediction coefficient sets 1, 2 and 3 is selected by an optimum data generating circuit MST, to be described later. Where the second mode is specified, the above block calculation process is performed using the optimum prediction coefficient set selected in the first mode. A subtracter SB1 subtracts the prediction waveform data "pd1–8" from the input waveform data "id1–8" to produce prediction error data "pe1–8" (each having a 16-bit structure) which is the difference (error) between the input waveform data "id1–8" and the prediction waveform data "pd1–8".

The optimum data generating circuit MST produces per one block an optimum quantization step for storing the optimum prediction coefficient set and the prediction error data "pe1–8" based on the prediction error data "pe1–8" produced in the first mode. This optimum data generating circuit MST is mainly formed by an absolute value circuit ABS, a maximum value circuit MAX and a minimum value circuit MIN, which will be explained in detail below.

A quantizer QNT produces, in the second mode, quantized prediction error data "pq1–8" (each having a 5-bit structure) by quantizing the prediction error data "pe1–8" in the optimum quantization step produced by the optimum data generating circuit MST. A data output circuit OPT outputs the optimum prediction coefficient set, the optimum quantization step and the quantized prediction error data "pq1–8" to the memory circuit MEM in one block units. A subtracter SB2 subtracts the quantized prediction error data "pq1–8" from the prediction error data "pe1–8" to produce, in the second mode, quantization error data "qe1–8" (each having a 5-bit structure) which are the differences (errors) between the prediction error data "pe1–8" and the quantized prediction error data "pq1–8". A latch LT3 latches the quantization error data "qe1–8" and functions as a delay circuit. A switching circuit SW1 selects a logical value "0" in the first mode and selects the quantization error data "qe1–8" in the second mode by means of the mode specifying signal "md" from the mode specifying circuit MOD.

Next, the operation of the waveform data compression apparatus shown in FIG. 3 will be explained with reference to the timing chart shown in FIG. 4. The waveform data compression apparatus specifies the first mode or the second mode by means of the mode specifying signal "md" from the mode specifying circuit MOD. In the first mode block calculation processing is performed for every 1 to 3 prediction coefficient sets with respect to one block to obtain an optimum prediction coefficient from among the prediction coefficient sets 1 to 3.

In the second mode block calculation processing is performed based on this optimum prediction coefficient and data is output in one block units. Note that in the mode specifying signal "md" of FIG. 4, the logical value "0" indicates the first mode and the logical value "1" indicates the second mode.

In the first mode, block processing in the blocking circuit BLK, block calculation processing in the operating circuit OPR, prediction error data generation processing in the subtracter SB1, optimum value generation processing in the optimum data generating circuit MST, etc. are performed. The operations in the first mode will be explained in detail below.

First, the block processing in the blocking circuit BLK is performed. Namely, one block portion of input data, i.e. eight digitalized continuous input waveform data, are input to the blocking circuit BLK according to an input control signal "ic". Then the following processes are performed on the thus blocked input waveform data.

Block calculation processing is performed as below in the operating circuit OPR. First, block processing is performed using prediction coefficient set 1. Namely, in the operating circuit OPR, 8 blocked continuous input waveform data "id1–8" are sequentially input from the blocking circuit BLK, prediction calculation processing is sequentially performed using these input waveform data "id1–8", and prediction waveform data "pd1–8" of the input waveform data "id1–8" are sequentially output. The prediction calculation processing comprises a delay operation in the latches LT1 and LT2, a multiplication operation in the multipliers ML1 and ML2, and an adding operation in the adders AD1 and AD 2. Note that although the output of the switching circuit SW1 is connected to one input of the adder AD1, because the switching circuit SW1 selects the logical value "0" in the first mode according to the mode specifying signal "md", actual adding is not performed in the adder AD1. Upon conclusion of the block calculation processing using the prediction coefficient set 1, thereafter in the same way block calculation processing using the prediction coefficient set 2 and block calculation processing using the prediction coefficient set 3 are sequentially performed.

In the subtracter SB1, prediction error data production processing is performed and the prediction error data "pe1–8" which is the difference (error) between the input waveform data "id1–8" and the prediction waveform data "pd1–8" is produced. This prediction error data production processing is performed on each of the prediction coefficient sets 1, 2 and 3 in the same way as the block calculation process.

In the optimum data generating circuit MST, optimum value generating processing is performed as below. Firstly, the prediction error data "pe1–8" with respect to the prediction coefficient set 1 are input to the optimum data generating circuit MST. The absolute values of these prediction error data "pe1–8" are sequentially produced by the absolute value circuit ABS. Then the maximum values among the absolute valued data are obtained as absolute value data by means of the maximum value circuit MAX. Namely, among the prediction error data "pe1–8" with respect to the prediction coefficient set 1, those with the greatest prediction errors are selected. When the processing of the prediction coefficient set 1 is finished, thereafter in the same way, those with the greatest prediction errors among the prediction error data "pe1–8" with respect to the prediction coefficient set 2 and the prediction coefficient set 3 are selected as maximum value data. In the minimum value circuit MIN the minimum value data which are minimum among the thus-selected maximum value data are obtained. Then the prediction coefficient set with respect to the minimum value dam is determined as the optimum prediction coefficient set. Also, an optimum quantization step for memorizing the prediction error data "pe1–8" obtained in the second mode is simultaneously obtained based on the minimum value data. In this way, the optimum prediction coefficient set and optimum quantization step with respect to the input waveform data "id1–8" of one block portion is obtained in the optimum value generation process in the optimum data generation circuit MST. Note that a description with respect to the quantization step will be given below.

Each process in the first mode is performed as set forth above. When the first mode is completed, operation subsequently moves to the second mode. In the second mode, the block calculation process in the operating circuit OPR, prediction error data generating process in the subtracter SB1, quantization process in the quantizer QNT, quantized error data generating process in the subtracter SB2, the data output process in the data output circuit OPT, etc. are performed. The operations in the second mode will be explained in detail below.

In the operating circuit OPR the block calculation process is performed using the optimum prediction coefficient set selected in the first mode. Namely, in the operating circuit OPR, the input waveform data "id1–8" which are the same as those in the first mode are sequentially input from the blocking circuit BLK, the prediction calculation process is sequentially performed on the input waveform data "id1–8" using the optimum prediction coefficient sets, and prediction waveform data "pd1–8" of the input waveform data "id1–8" are sequentially output. The optimum prediction coefficient sets are selected by means of a signal to the prediction coefficient memory circuit COE from the optimum data generating circuit MST. Note that since the switching circuit SW1 selects the output of the latch LT3 according to the mode specifying signal "md", the output of the latch LT3 is connected to one input of the adder AD1 via the switching circuit SW1, this process differing from the block calculation process in the first mode in particular in terms of this point.

In the subtracter SB1, the prediction error data generating process is performed on the optimum prediction coefficient sets and prediction error data "pe 1–8" which are the differences (errors) between the input waveform data "id1–8" and the prediction waveform data "pd1–8" are generated.

In the quantizer QNT, the prediction error data "pe1–8" are quantized by the optimum quantization step produced by the optimum data generating circuit MST and quantization processing for producing the quantized prediction error data "pq1–8" is performed. At this point the optimum quantization step obtained in the first mode will be explained. The structural bit numbers of the input waveform data "id1–8" and the prediction waveform data "pd1–8" are each 16 bits and the structural bit number of the prediction error data "pe1–8" which is the difference between both of these is 16 bits. However, because the prediction error data "pe1–8" is difference data, the upper bits are normally "0" such as for example "0000000101100101" (where the uppermost bit is a code bit). Also, generally even when the lower bits are removed there is no major effect. Consequently, formation of the prediction error data "pe1–8" on the order of 5 bits for example is possible. In the above numerical value example, the quantized prediction error data "pq1–8" can be expressed as "01011" (where the uppermost bit is a code bit) with the upper 6 bits omitted and the lower 5 bits eliminated. In the above example, "6" corresponding to the omitted upper 6 bits is the optimum quantization step. In this way, the optimum quantization step means numerical value data corresponding to the number of bits generally omitted or eliminated.

In the subtracter SB2, a quantization error dam generating process is performed and the quantization error data "qe1–8" which are the difference between the prediction error data "pe1–8" and the quantized prediction error data "pq1–8" are generated. These quantization error data "qe1–8" are sequentially delayed by the latch LT3 and input to the adder AD1 through the switching circuit SW1. In short, the effect of the quantization errors is reduced by feeding the quantization errors back to the operating circuit OPR.

In the data output circuit OPT, the data output process is performed. In other words, the optimum prediction coefficient set selected in the first mode and the optimum quantization step obtained in the first mode together with the quantized prediction error dam "pq1–8" generated in the second mode are output to the memory circuit MEM in one block units by means of an output control signal "oc".

In the above manner, when the processing of the first mode and second mode with respect to the data of the same block is finished, the same processes are performed on the dam of the next block. Thereafter, in the same way, the same processes are continuously performed in block units.

In the above prior art example, a total of four block calculation process (three times in the first mode, once in the second mode) are performed for one block. Consequently, when block calculation processes after the first two times in one block (the second and third block calculation processes in the first mode and the block calculation process in the second mode) are performed, data of the final prediction calculation process of the previous block calculation process (the first, second and third block calculation processes in the first mode) are memorized in the latches LT1 and LT2 in the operating circuit OPR. As a result, the results of the final prediction calculation process of the previous block are not reflected in the first prediction calculation processes of the block calaulation processes after the first two times in one block. Consequently, there has been the problem that prediction errors become very large.

Also, in the initial block after the waveform data compression apparatus reaches an initial state, when block calculation processes after the first two times in one block (the second and third block calculation processes in the first mode and the block calculation process in the second mode) are performed, data of the final prediction calculation process of the previous block calculation process (the first, second and third block calculation processes in the first mode) are memorized in the latches LT1 and LT2 in the operating circuit OPR. As a result, there is the problem that the results of the block calculation processes (the first, second and third block calculation processes in the first mode) which originally should have no relationship are reflected in the first prediction calculation processes of each of the block calculation processes after the second time in the initial block.

SUMMARY OF THE INVENTION

The object of the invention of the present application is to provide a waveform data compression apparatus wherein it is possible to use suitable data in the initial prediction calculation process of the block calculation process.

(1) The invention of the waveform data compression apparatus of the present application comprises, in an operating section (OPR), data holding sections (KP 1, KP2) for holding dam corresponding to at least final first waveform data (id8, id7) to be used in a final prediction calculation process of a block calculation process in a second mode, and first selection sections (SW2, SW3) for using the data held in the data holding sections (KP1, KP2) in place of data memorized in second delay sections (LT1, LT2) in each initial prediction calculation process of each block calculation process in the first mode and second mode of the next block.

(2) The invention of the waveform data compression apparatus of the present application further comprises, in the operating section (OPR) in the waveform data compression apparatus described in the above (1), second selection sections (SW4, SW5) for using reset data in place of data memorized in second delay sections (LT1, LT2) in each initial prediction calculation process of each block calculation process in the first mode and second mode of the initial block after the waveform data compression apparatus reaches an initial state.

(3) Another invention of the waveform data compression apparatus of the present application is characterized in that, in the waveform data compression apparatus described in the above (1), the first delay section (LT3) has a function of holding final quantization error data (qe8) among quantization error data (qe1-8) of one block portion sequentially delayed by the first delay section, and a first adding section (AD1) has a function of adding, in a first prediction calculation process of the block calculation process in the second mode of a next block, data held in the data holding section (KP9) and the final quantization error data (qe8) held in the first delay section (LT3).

(4) Another invention of the waveform data compression apparatus of the present application further comprises, in the operating section (OPR) in the waveform data compression apparatus described in the above (3), second selection sections (SW4, SW5) for using reset dam in place of dam memorized in second delay sections (LT1, LT2) in each initial prediction calculation process of each block calculation process in the first mode and second mode of the initial block after the waveform data compression apparatus reaches an initial state, and a third selection section (SW6) for using reset data in place of the final quantization error data (qe8) memorized in the first delay section CLT3) and added by the first adding section (AD1), in the first prediction calculation process of the block calculation process in the second mode of the initial block after the waveform data compression apparatus has reached an initial state.

DRAWINGS

These and other features, aspects and advantages of the present invention will become better understood with reference to the following description, appended claims and accompanying drawings wherein

DESCRIPTION OF THE INVENTION

Figure 1:
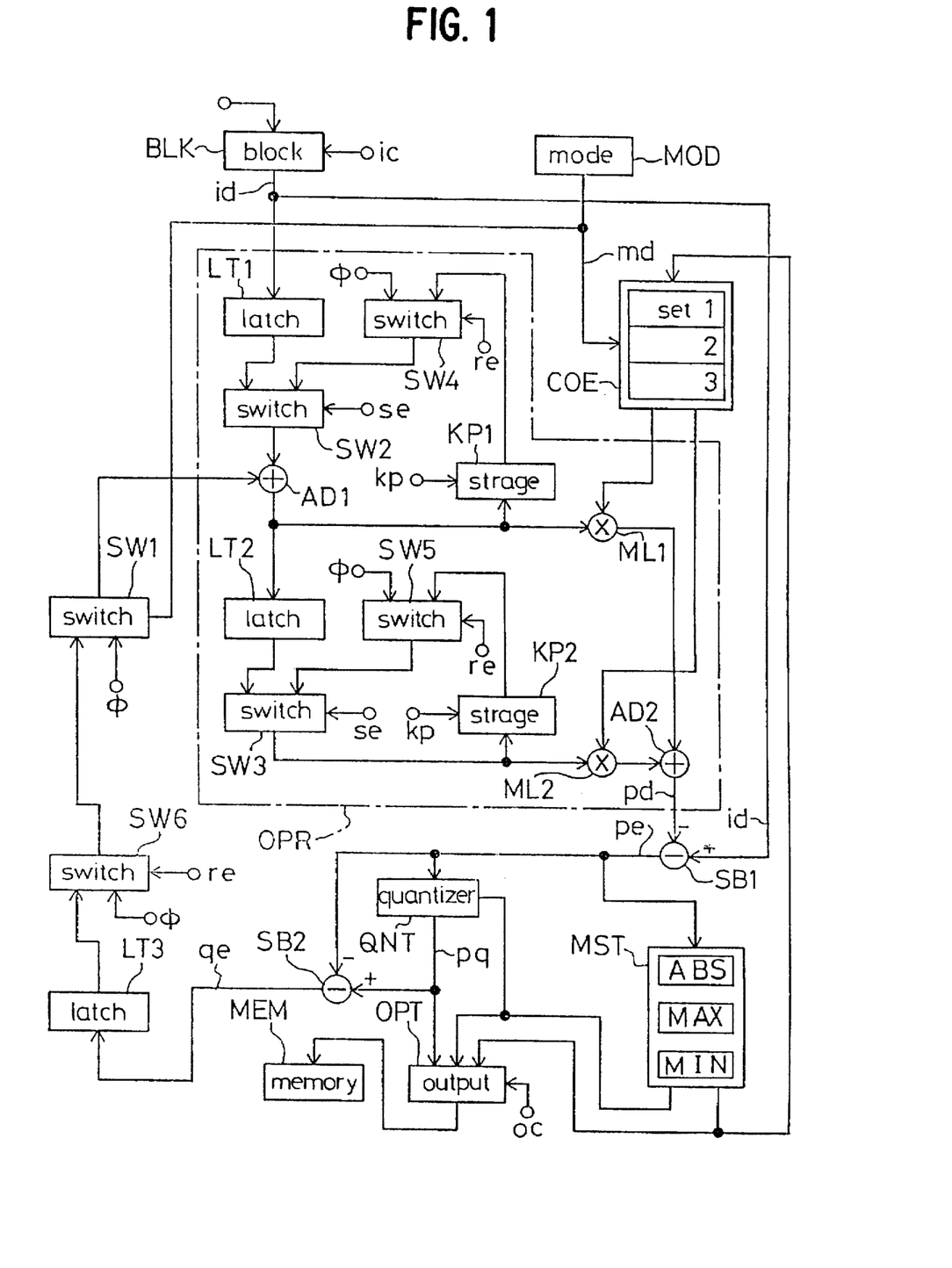
FIG. 1 is a block drawing showing the structure of an embodiment of the invention according to the present application.
Figure 2:
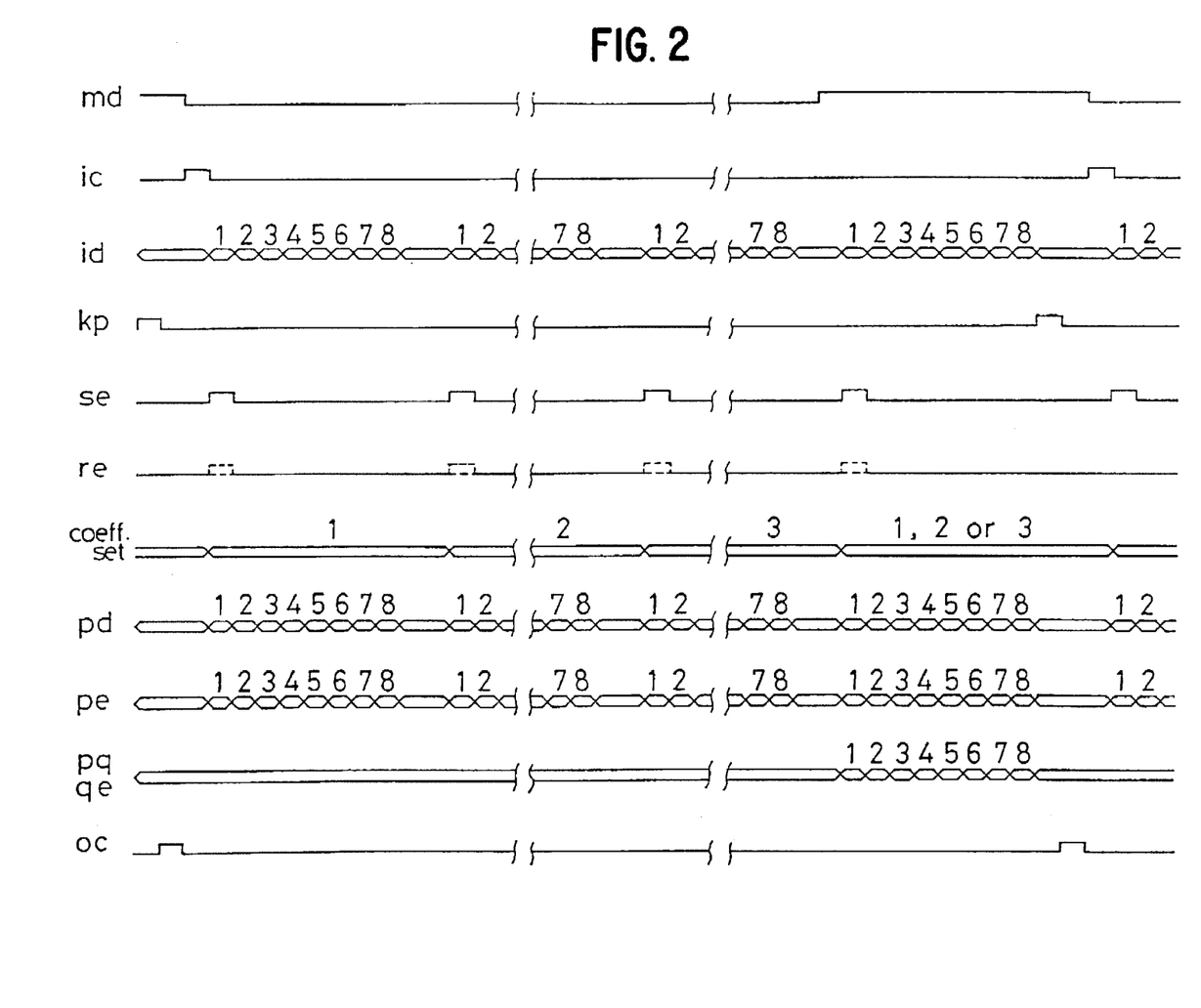
FIG. 2 is a time chart showing the operation of the embodiment of FIG. 1.

Hereunder, embodiments of the waveform data compression apparatus of the present application will be explained with reference to FIG. 1 and FIG. 2. FIG. 1 is a block drawing showing an embodiment of a waveform data compression apparatus using the APC system and FIG. 2 is a time chart showing operations thereof.

Since the basic structure of the present embodiment is similar to the prior art example shown in FIG. 1, the same reference numbers will be attached to structural components corresponding to structural components of the prior art example shown in FIG. 3 and explanation thereof will be omitted. Hereunder, structural components of the waveform data compression apparatus shown in FIG. 1 which differ from those of the prior art example will be described.

Data holding circuits KP1 and KP2 hold data generated by the final prediction calculation process in the block calculation process in the second mode.

Namely, the data holding circuit KP1 holds data corresponding to the final input waveform data "id8" to be used in the final prediction calculation process in the block calculation process in the second mode and the data holding circuit KP2 holds data corresponding to input waveform data "id7" previous thereto. Note that although two data holding circuits corresponding to the order of the operating circuit OPR are provided in the example shown in FIG. 1, where the operating circuit OPR is of the order of n, n number of dam holding circuits may be provided.

The switching circuits SW2 and SW3 are for using the data held in the data holding circuits KP1 and KP2 in place of the using the data of the latches LT1 and LT2 when the first prediction calculation process is performed in each block calculation process (three times in the first mode, once in the second mode) for one block. The switching circuits SW4 and SW5 are for using logical value "0", i.e. reset data, in place of using the data of the latches LT1 and LT2 when performing the first prediction calculation process in each block calculation process (three times in the first mode, once in the second mode) with respect to the first block after the waveform data compression apparatus has reached an initial state. The switching circuit SW6 is for using logical value "0", i.e. reset data, in place of using the delayed quantization error data from the latch LT3 to the adder AD1 when performing the first prediction calculation process in the block calculation process in the second mode with respect to the first block after the waveform data compression apparatus has reached an initial state.

Next, the operations of the waveform data compression apparatus shown in FIG. 1 will be explained with reference to the timing chart shown in FIG. 2. In the waveform data compression apparatus the first mode or the second mode are specified by the mode specifying signal "med" from the mode specifying circuit MOD. In the first mode, block calculation processing is performed for each prediction coefficient set 1 to 3 with respect to data of one block and an optimum prediction coefficient is obtained from among the prediction coefficient sets 1 to 3.

In the second mode, block calculation processing is performed based on this optimum prediction coefficient and data is output in one block units. Note that in the mode specifying signal "md" of FIG. 2, the logic value "0" and the logic value "1" respectively indicate the first mode and second mode.

In the first mode, the blocking process in the blocking circuit BLK, the block calculation process in the operating circuit OPR, the prediction error data generating process in the subtracter SB1, the optimum value generating process in the optimum data generating circuit MST, etc. are performed. Herebelow, the operations in the first mode will be explained in detail.

First, the block calculation process in the blocking circuit BLK is performed.

Namely, the input waveform data of one block, i.e. eight digitalized continuous input waveform dam, are input to the blocking circuit BLK by an input control signal "ic". Then each of the following processes is performed on the input waveform dam blocked in this manner.

In the operating circuit OPR the block calculation process is performed in the following manner. Herebelow, this will be explained separately for cases where a process is performed continuously with respect to each block and cases where a process is performed with respect to a first block after the waveform data compression apparatus reaches an initial state.

Firstly, this will be explained in a case where a process is performed continuously with respect to each block. First, block calculation processing is performed using the prediction coefficient set 1. Namely, in the operating circuit OPR, the eight blocked continuous input waveform data "id1–8" from the blocking circuit BLK are sequentially input, prediction calculation processing is sequentially performed using these input waveform data "id1–8", and prediction waveform data "pd1–8" of each of the input waveform data "id1–8" are sequentially output. What requires attention here is, with respect to the initial prediction calculation process, using the data held in the data holding circuits KP 1 and KP2 in place of the data of the latches LT1 and LT2. Namely, the data held in the data holding circuit KP1 is input to the adder AD1 through the switching circuit SW4 and switching circuit SW2 and the data held in the data holding circuit KP2 is input to the multiplier ML2 through the switching circuit SW5 and the switching circuit SW3 by a setting signal "se". Data corresponding to the final input waveform data "id8" of the block one before the current block are held in the data holding circuit KP1, and data corresponding to the input waveform data "id7" one previous thereto are held in the data holding circuit KP2. Consequently, the result of the final prediction calculation process of the block prior thereto is reflected in the prediction calculation process of the current block. Note that although the output of the switching circuit SW1 is connected to one of the inputs of the adder AD1, since the switching circuit SW1 selects the logical value "0" by means of the mode specifying signal "md" in the first mode, actual addition is not performed in the adder AD1. When the block calculation process using the prediction coefficient set 1 is finished, thereafter in the same manner block calculation processing using the prediction coefficient set 2 and block calculation process using the prediction coefficient set 3 are sequentially performed.

Next, explanation will be given in the case where processing with respect to a first block after the waveform data compression apparatus reaches an initial state.

With respect to a first block after the waveform data compression apparatus reaches an initial state, processes differing from the above-described processes are performed in the first prediction calculation process of each block calculation process with respect to the prediction coefficient sets 1 to 3. Namely, reset data, i.e. logical value "0", are input to the adder AD1 through the switching circuit SW4 and the switching circuit SW2, and the same logical value "0" is input to the multiplier ML2 through the switching circuit SW5 and the switching circuit SW3 by means of a reset signal "re". Performing this type of process, because data of the final prediction calculation process of the block calculation process with respect to the prediction coefficient set 1 are stored in the latches LT1 and LT2 in the operating circuit OPR when the first prediction calculation process of the block calculation process is performed on the prediction coefficient set 2, and data of the final prediction calculation process of the block calculation process with respect to the prediction coefficient set 2 are stored in the latches LT1 and LT2 in the operating circuit OPR when the first prediction calculation process of the block calculation process is performed on the prediction coefficient set 3, is for preventing data which should be originally unrelated from being reflected in the prediction calculation process with respect to the prediction coefficient sets 2 and 3.

Figure 4:
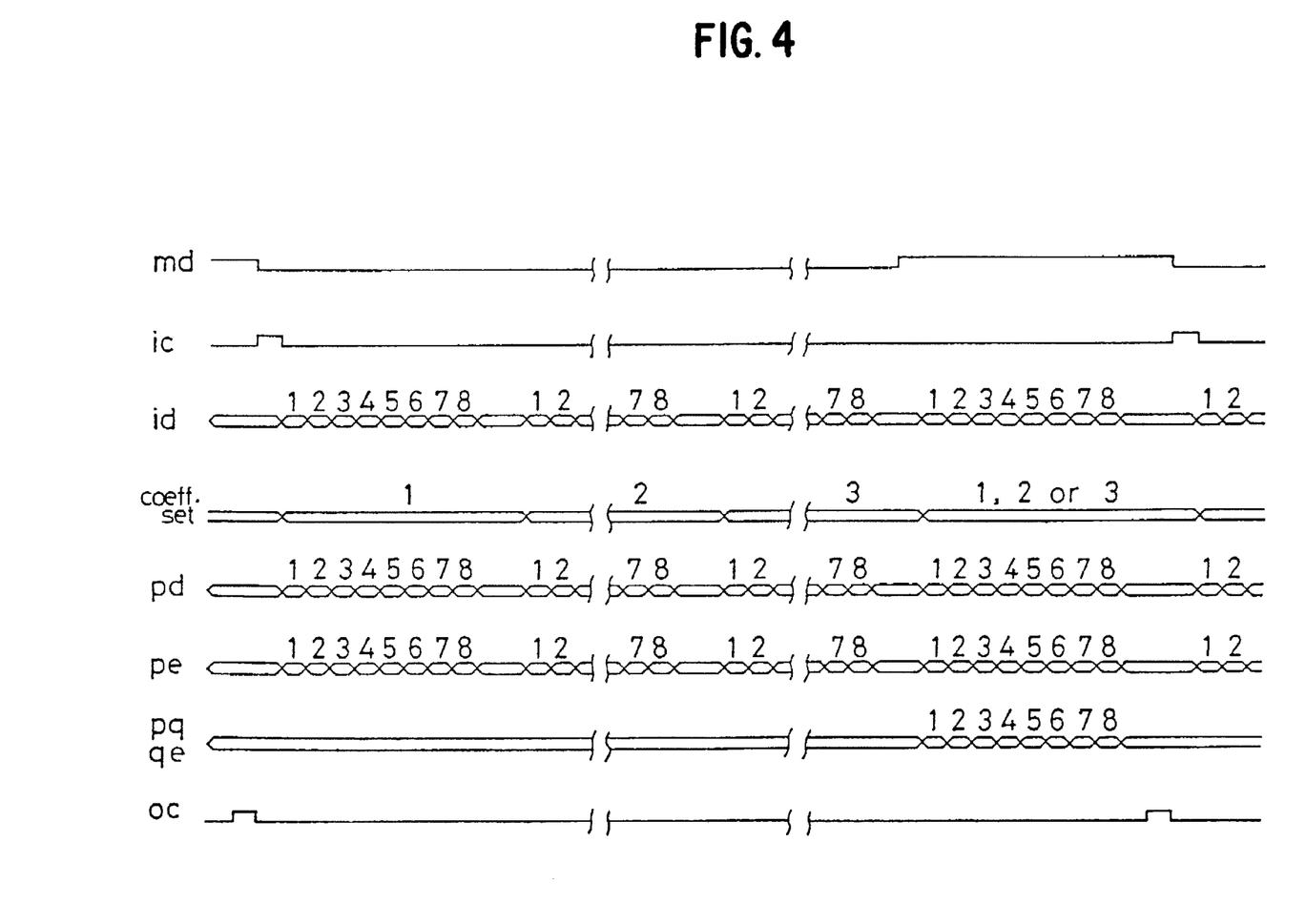
FIG. 4 is a time chart showing the operation of the prior art example of FIG. 3.

Since the prediction error data generating process in the subtracter SB1 and the optimum value generating process in the optimum data generating circuit MST are the same as the prior art example shown in FIG. 3 and FIG. 4, explanation thereof will be omitted.

When the first mode is finished, operation subsequently moves to the second mode. In the second mode, the block calculation process in the operating circuit OPR, the prediction error data generating process in the subtracter SB1, the quantization process in the quantizer QNT, the quantization error data generating process in the subtracter SB2, the data output process in the data output circuit OFT, etc. are performed. Herebelow, the operations in the second mode will be explained in detail.

In the operating circuit OPR, the block calculation process is performed using the optimum prediction coefficient set selected in the first mode. Herebelow, this will be explained separately for a case where processing is continuously performed with respect to each block and for a case where processing is performed with respect to a first block after the waveform data compression apparatus reaches an initial state.

Firstly, explanation will be given with regard to a case where the processes are performed continuously with respect to each block. Input waveform data "id 1–8" of the same block as in the first mode are sequentially input from the blocking circuit BLK, prediction calculation processing using optimum prediction coefficient set is sequentially performed on these input waveform data "id1–8", and prediction waveform data "pd1–8" of each of the input waveform data "id1–8" are sequentially output. The optimum prediction coefficient set is selected by a signal from the optimum data generating circuit MST to the prediction coefficient memory circuit COE. Also in this second mode as in the first mode, data held in the data holding circuits KP1 and KP2 is used in place of the data of the latched LT1 and LT2 with respect to the first prediction calculation process. Namely, the data held in the dam holding circuit KP1 are input to the adder AD 1 through the switching circuit SW4 and the switching circuit SW2, and the data held in the data holding circuit KP2 are input to the multiplier ML2 through the switching circuit SW5 and the switching circuit SW3, by means of the setting signal "se". Data corresponding to the last input waveform data "id8" of the previous block to the current block is held in the data holding circuit KP1, and data corresponding to the input waveform data "id7" prior thereto is held in the data holding circuit KP2. Consequently, the result of the final prediction calculation process of the block prior to the current block is reflected in the prediction calculation process of the current block. Note that because the switching circuit SW1 selects the output of the latch LT3 through the switching circuit SW6 due to the mode specifying signal "med", the output of the latch LT3 is connected to one input of the adder AD1 through the switching circuit SW6 and the switching circuit SW1.

Next, explanation will be given with regard to a case wherein processing is performed on the first block after the waveform data compression apparatus has reached an initial state. With regard to the first block after the waveform data compression apparatus has reached an initial state, different processes to the processes described above are performed in the first prediction calculation process of the block calculation process. Namely, reset data, i.e. logical value "0", are input to the adder AD1 through the switching circuit SW4 and the switching circuit SW2, and the same logical value "0" is input to the multiplier ML2 through the switching circuit SW5 and the switching circuit SW3 by means of a reset signal "re". Performing this type of process, because data of the final prediction calculation process of the block calculation process with respect to the prediction coefficient set 3 are stored in the latches LT1 and LT2 in the operating circuit OPR when the first prediction calculation process of the block calculation process is performed in the second mode, is for preventing such data which should be originally unrelated from being reflected in the prediction calculation process of the second mode. Also, reset data, i.e. logical value "0", are input to the adder AD1 through the switching circuit SW6 and the switching circuit SW1 by means of the reset signal "re".

With regard to the prediction error data generating process in the subtracter SB1, the quantization process in the quantizer QNT, the quantization error data generating process in the subtracter SB2, the data output process in the data output circuit OPT, etc., since these are the same as the prior art example shown in FIG. 3 and FIG. 4, explanation thereof will be omitted.

When the processes of the first mode and second mode with respect to the data of one block are finished in the above manner, the same processes are performed on the data of the next block. Thereafter, in the same manner, the same processes are continuously performed in block units.

In the invention of the present application, since a data holding section for holding data corresponding to at least final first waveform data to be used in a final prediction calculation process of the block calculation process in the second mode, and a first selection section for using the data held in the data holding section in place of data memorized in the second delay section in each initial prediction calculation process of each block calculation process in the first mode and second mode of the next block are provided in the operating section, it is possible to reflect the results of the final prediction calculation process of a previous block in the first prediction calculation process of each block calculation process with respect to one block, and reduction of prediction errors is possible.

Further, in the above operating section, with what is provided in the second selection section or what is provided in the second and third selection sections, it is possible to prevent the results of the previous block calculation process which should originally be unrelated from being reflected in the prediction calculation process of the block calculation process with respect to a first block after the waveform data compression apparatus has reached an initial state, and reduction of prediction errors is possible.

What is claimed is:

1. A waveform data compression apparatus comprising:
   a blocking section for blocking a fixed number of digitized continuous first waveform data into one block units;
   an operating section for performing a block calculation process on said one block units, the block calculation process executing a prediction calculation process sequentially on the first waveform data to sequentially produce second waveform data which is prediction data of the first waveform data;
   the operating section having a prediction coefficient memory section for storing a plurality of prediction coefficient sets each containing a plurality of prediction coefficients;
   a mode specifying circuit for specifying a first mode and a second mode;
   a prediction error production section for producing first prediction error data which is a difference between the first waveform data and the second waveform data;
   an optimum data production section for producing, in the first mode, optimum prediction coefficient sets with respect to the first waveform data of said one block unit and an optimum quantization step for storing the first prediction error data of the one block unit, based on of the first prediction error data produced in the first mode;
   a quantization section for producing, in the second mode, second prediction error data which is a quantization of the first prediction error data in the optimum quantization step;
   a quantization error production section for producing, in the second mode, quantization error data which is the difference between the first prediction error data and the second prediction error data;
   a first delay section for sequentially delaying the quantization error data;
   a data output section for outputting in one block units the optimum prediction coefficient sets, the optimum quantization step and the second prediction error data;

the operating section having:
  a plurality of second delay sections for sequentially delaying the first waveform data of the one block units from the blocking section;
  a first adding section for adding, in the second mode, the first waveform data and the quantization error data delayed by the first delay section;
  a plurality of multiplication sections for multiplying each delay data output from the second delay sections by each prediction coefficient of the prediction coefficient sets;
  a second adding section for adding multiplication data output from the multiplication sections to produce the second waveform data;
  first mode means for performing the block calculation process on each of said one block units a number of times corresponding to a number of the prediction coefficient sets to determine the optimum prediction coefficient set for said digitized continuous first waveform data in each of said one block units;
  second mode means for performing the block calculation process using the optimum prediction coefficient sets on each of said digitized continuous first waveform data in each of said one block units;
  a data storing section for storing data corresponding to at least a last one of said digitized continuous first waveform data used in a last one of the prediction calculation processes of the block calculation process in the second mode; and
  a first selection means for using data stored in the data storing section in place of data stored in the second delay section in a first one of each of the prediction calculation processes of each of the block calculation processes in the first mode and the second mode of a following one of said one block units.

2. The waveform data compression apparatus according to claim 1, wherein said operating section further includes a second selection means for using reset data in place of data stored in the second delay section in the first of each of the prediction calculation processes of each of the block calculation processes in the first mode and the second mode of a first one block unit following initialization of the waveform data compression apparatus.

3. The waveform data compression apparatus according to claim 1 wherein the first delay section stores final quantization error data for each of said first continuous digitized waveform data of said one block portion to effect a sequential delay; and
  the first adding section has a function of adding data stored in the data storing section and the final quantization error data stored in the first delay section, in the first prediction calculation process of the block calculation process in the second mode of the next block.

4. The waveform data compression apparatus according to claim 3, further comprising a second selection means for using reset data in place of data stored in the second delay section in the first of each of the prediction calculation processes of each of the block calculation processes in the first mode and second mode of the first block after the waveform data compression apparatus reaches an initialized state, and a third selection means for using reset data in place of the final quantization error data stored in the first delay section and added by the first adding section, in the first prediction calculation process of the block calculation process in the second mode of the first block after the waveform data compression apparatus reaches the initialized state.

5. A waveform compression apparatus comprising:
  blocking means for sequentially grouping a predetermined number m of first digitized waveform data into blocks where in a given one of said block said first digitized waveform data is represented by $id_1$–$id_m$;
  first processing means for performing sequential prediction calculations on a given block to sequentially calculate prediction waveform data $pd_1$–$pd_m$, corresponding to first digitized waveform data $id_1$–$id_m$, respectively, using an $n^{th}$ order prediction calculation applying a selected prediction coefficient set having n coefficients and further using n latch delay means to sequentially delay prediction calculation data corresponding to said first digitized waveform data $id_1$–$id_m$ of said given block;
  second processing means for calculating respective prediction error data $pe_1$–$pe_m$, differences between each of said prediction waveform data $pd_1$–$pd_m$ and respective ones of said first digitized waveform data $id_1$–$id_m$ for said given block;
  coefficient memory means for storing x number of prediction coefficient sets from which said selected prediction coefficient set is selected;
  first mode means for controlling operation in a first mode to select each of said prediction coefficient sets for sequential application to said first digitized waveform data $id_1$–$id_m$ of said given block by said first processing means in x number of said sequential prediction calculations to calculate said prediction error data $pe_1$–$pe_m$ for each of said x number of prediction coefficient sets;
  optimum selection means for selecting an optimum one of said prediction coefficient sets and a quantizing value associated therewith based on said prediction error data $pe_1$–$pe_m$ for application to said given block;
  second mode means for controlling operations during a second mode to use said optimum one of said prediction coefficient sets in said first processing means for application to said given block to produce an optimum set of said prediction waveform data $pd_1$–$pd_m$ and to calculate an optimum set of said prediction error data $pe_1$–$pe_m$;
  quantizing means for quantizing said optimum set of said prediction error data $pe_1$–$pe_m$ based upon a maximum thereof determined by said optimum selection means to produce prediction error quantized data $pq_1$–$pq_m$;
  substraction means for respectively subtracting said prediction error quantized data $pq_1$–$pq_m$ from said prediction error data $pe_1$–$pe_m$ to produce quantized error data $qe_1$–$qe_m$;
  latch means for delaying said quantized error data $qe_1$–$qe_m$;
  feedback means for introducing said quantized error data $qe_1$–$qe_m$ into said prediction calculations of said first processing means during said second mode;
  said first processing means having memory means for storing prediction calculation data associated with a final n ones of said first digitized waveform data $id_{m-(n-1)}$–$id_m$ produced during second mode operations on an immediately preceeding block; and switching means for using said prediction calculation data stored in said memory means in place of prediction calculation data in said delay latch means in a first calculation in each of said sequential prediction calculations performed on said given block.

6. The waveform compression apparatus according to claim 5 further comprising initializing means for substituting a feedback initialization value in place of said quantized error data $qe_1$–$qe_m$ into each of said prediction calculations of said first processing means in said second mode during an initial block calculation in said second mode.

7. The waveform compression apparatus according to claim 5 further comprising initializing means for substituting initial calculation data in place of said prediction calculation data in said first calculation in each of said sequential prediction calculations performed during an initial block calculation of said first processing means during said first and second modes.

* * * * *